United States Patent
Bakker

(10) Patent No.: US 8,311,687 B2
(45) Date of Patent: Nov. 13, 2012

(54) METHOD AND SYSTEM FOR VERTICAL NAVIGATION USING TIME-OF-ARRIVAL CONTROL

(75) Inventor: Michael John Bakker, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 152 days.

(21) Appl. No.: 12/847,835

(22) Filed: Jul. 30, 2010

(65) Prior Publication Data

US 2012/0029735 A1    Feb. 2, 2012

(51) Int. Cl.
G05D 1/00    (2006.01)

(52) U.S. Cl. ............ 701/3; 701/121; 244/75.1; 244/182

(58) Field of Classification Search ............... 701/121, 701/123, 3–5; 244/180–184
See application file for complete search history.

(56) References Cited

U.S. PATENT DOCUMENTS

| | | | |
|---|---|---|---|
| 4,488,235 A | 12/1984 | Miller | |
| 4,633,404 A | 12/1986 | Greeson et al. | |
| 4,709,336 A * | 11/1987 | Zweifel | 701/5 |
| 4,750,127 A * | 6/1988 | Leslie et al. | 701/16 |
| 5,121,325 A * | 6/1992 | DeJonge | 701/123 |
| 5,606,505 A * | 2/1997 | Smith et al. | 701/99 |
| 6,262,674 B1 * | 7/2001 | Wyatt | 340/975 |
| 6,507,782 B1 * | 1/2003 | Rumbo et al. | 701/121 |
| 2005/0283306 A1 | 12/2005 | Deker | |
| 2008/0215196 A1 * | 9/2008 | Deker | 701/5 |
| 2009/0112454 A1 | 4/2009 | Wachenheim et al. | |
| 2009/0259351 A1 * | 10/2009 | Wachenheim et al. | 701/7 |
| 2009/0259392 A1 * | 10/2009 | Berard et al. | 701/121 |
| 2010/0114407 A1 * | 5/2010 | Klooster et al. | 701/3 |
| 2010/0131124 A1 | 5/2010 | Klooster | |
| 2010/0131125 A1 | 5/2010 | Blanchon et al. | |
| 2010/0318244 A1 * | 12/2010 | Gomez et al. | 701/3 |
| 2011/0029158 A1 * | 2/2011 | Klooster | 701/3 |
| 2011/0137493 A1 * | 6/2011 | Dacre-Wright et al. | 701/3 |
| 2011/0270470 A1 * | 11/2011 | Svoboda et al. | 701/3 |

* cited by examiner

Primary Examiner — Gerald J. O'Connor
Assistant Examiner — Jonathan K Ng
(74) Attorney, Agent, or Firm — David J. Clement, Esq.; Armstrong Teasdale LLP

(57) ABSTRACT

A method and systems for controlling an aircraft during descent are provided. The control system includes an input device configured to receive a speed margin for the vehicle and a processor communicatively coupled to the input device wherein the processor is programmed to automatically determine a flight path of the vehicle that is shallower than an idle flight path for the vehicle and generate a flight control surface control signal configured to maintain the determined flight path using the received speed margin. The control system further includes an output device communicatively coupled to the processor. The output device is configured to transmit the flight control surface control signal to a flight control system of the vehicle.

18 Claims, 3 Drawing Sheets

METHOD AND SYSTEM FOR VERTICAL NAVIGATION USING TIME-OF-ARRIVAL CONTROL

BACKGROUND OF THE INVENTION

The field of the invention relates generally to a vehicle time based management system, and more specifically, to a method and systems for vertical navigation using time-of-arrival control.

Conventionally, aircraft are controlled in three dimensions; latitude, longitude, and altitude. More recently, the ability to control aircraft in the fourth dimension, time, has been shown to enable advanced airspace management resulting in increased capacity. The use of time-based arrival management facilitates earlier landing time assignments and more efficient use of the runway. This also results in economic benefits if each aircraft can determine its desired landing time using its most fuel optimum flight profile. However, in the absence of a defined geometric descent profile, current vertical navigation control algorithms use laws that control the elevators to a predetermined vertical path or vertical speed while maintaining a fixed throttle setting (typically idle). Using this control method, the speed is allowed to fluctuate over a large range of values, resulting in varying and inaccurate Estimated Time-of-Arrivals (ETAs) at points downstream of the aircraft. This adversely impacts the aircraft's adherence to a time constraint, typically referred to as a Required Time-of-Arrival (RTA) or Controlled Time-of-Arrival (CTA).

An aircraft descent trajectory is typically constructed by an onboard Flight Management System (FMS) backward from the destination to the point where the descent begins—referred to as the Top of Descent (T/D). The vertical portion of this computed trajectory consists of three general portions:

1) Approach Segment—this is the lowest portion of the descent, and contains a deceleration to the final landing speed along with extensions of high-lift devices and landing gear.

2) Geometric Segment—this is the middle portion of the descent, and is computed as a geometric sequence of lines which attempt to honor all altitude constraints. This segment may not exist if there are no altitude constraints that require it.

3) Idle Segment—this is the upper portion of the descent, and is computed assuming the descent target speed and idle thrust. Estimated ("forecast") winds and temperatures are assumed in the computation of this segment.

When the aircraft is flying the idle segment of the trajectory, the throttle is fixed at an idle setting and an algorithm controls the elevators to the predefined vertical path (VPATH). In this control strategy, speed is allowed to fluctuate. When the estimated parameters used to construct the descent path, most notably winds and temperatures, match the actual parameters, the speed of the aircraft will match the intended target speed. However, it is more likely the estimated parameters will vary from the actual values encountered in flight, and, in turn, cause the speed of the aircraft to deviate from the target airspeed.

A traditional vertical navigation strategy for idle segments will allow the actual airspeed to deviate from the target airspeed by some preset value (a typical value is 15 knots). When the deviation exceeds the preset threshold, the system will attempt to add thrust or drag to zero the difference between the actual airspeed and the target airspeed. For an underspeed condition, the system will attempt to add thrust, either by placing the throttle in a speed control mode (A/T engaged) or by prompting the flight crew. For an overspeed condition, the system will attempt to add drag either automatically or by prompting the flight crew; most systems today do not support the automatic addition of drag. The original purpose of this design was to ensure that the actual airspeed did not exceed the performance limits of the aircraft and/or speed constraints imposed by the crew, navigation procedures, or aviation authorities. The use of relatively large speed margins around the target speed was driven by a desire to minimize mode transitions while satisfying the speed constraints and limits. However, allowing the speed to fluctuate by relatively large speed margins makes it very difficult to accurately meet a time constraint ahead of the aircraft.

An alternative method has been recently proposed by US Patent Application US 2005/0283306. In this method, the vertical navigation control strategy is to retain the idle thrust setting and use the elevators to control to speed as long as the actual aircraft altitude is within some range of the specified vertical path position at the current lateral position. When the actual altitude deviates by more than this value, the control strategy is modified to regain the specified vertical path while maintaining the target speed. Unfortunately, this method will also have a negative effect on the time-of-arrival control if the altitude band is too large as the ground speed (which directly affects time-of-arrival) is dependant not just on airspeed but also on altitude. Conversely, if the altitude band is too small, the pitch of the aircraft may continually vary and negatively impact the comfort of the aircraft passengers. It should be noted that this method does not truly address the energy problem in situations where additional drag is required to deal with errors in forecasted parameters. It simply allows the error to manifest itself as an altitude error rather than a speed error. It does not truly solve the four-dimensional Required Navigation Performance (4D RNP) problem.

Another alternative method has been proposed by U.S. Pat. No. 6,507,782. This patent promotes the construction of a descent path which replaces idle path segments with shallower descent path segments. Since the path is shallower than idle, the throttle can be used to control to speed in most circumstances, thus increasing the ability of the control system to satisfy a time constraint in descent. Two methods for construction of a path shallower than idle are suggested: (1) construct the descent segment assuming speed on the elevator but use idle thrust plus some throttle increment (Idle+Δ) rather than pure idle thrust or (2) replace an idle segment with a constant flight path angle (FPA) shallower than idle. Both these ideas are not particularly new, and both have their relative disadvantages. For example, the Airbus A320/A340 FMS has the concept of an Idle+Δ thrust path for constant speed idle segments. The intent of the A320/A340 design was to add some speed margin to allow the FMS to control speed deviations automatically via the throttle as speedbrakes require crew intervention. The problem with the Idle+Δ concept as presented in the patent is that, like the A320/A340 design, it must be empirically derived and stored in the performance database for each aircraft. It also results in a somewhat static speed margin as compared to a modifiable FPA. Likewise, the constant FPA approach is an idea that has been presented in industry and implemented as part of a past R&D program. The problems with this approach include: (a) it may result in longer decelerations, (b) it may be very expensive in terms of fuel usage, and (c) it may be difficult to find a single, reasonable FPA that works for a range of conditions of a given aircraft.

BRIEF DESCRIPTION OF THE INVENTION

In one embodiment, a control system for controlling a flight path of a vehicle includes an input device configured to receive a speed margin for the vehicle and a processor communicatively coupled to the input device wherein the processor is programmed to automatically determine a flight path of the vehicle that is shallower than an idle flight path for the vehicle and generate a flight control surface control signal configured to maintain the determined flight path using the received speed margin. The control system further includes an output device communicatively coupled to the processor. The output device is configured to transmit the flight control surface control signal to a flight control system of the vehicle.

In another embodiment, a method of controlling an aircraft during descent includes receiving a speed margin input for controlling the aircraft, automatically determining, using a flight control processor, a first flight path of the aircraft that is shallower than an idle flight path for the aircraft, generating a flight control surface control signal configured to maintain the determined flight path using the received speed margin, and transmitting the flight control surface control signal to a flight control surface control system of the aircraft.

In yet another embodiment, a vehicle includes an input device configured to receive a speed margin input, a control system including a processor communicatively coupled to the input device. The processor is programmed to automatically determine a flight path of the vehicle that is shallower than an idle flight path for the vehicle and generate a flight control surface control signal configured to maintain the determined flight path using the received speed margin. The vehicle also includes an output device communicatively coupled to the processor. The output device is configured to transmit the flight control surface control signal to a flight control surface control system.

BRIEF DESCRIPTION OF THE DRAWINGS

FIG. 1 is a side elevational view of a vehicle such as an aircraft;

FIG. 2 is a schematic block diagram of a vehicle speed control system; and

FIG. 3 is a flowchart of a method of controlling an aircraft during descent.

DETAILED DESCRIPTION OF THE INVENTION

The following detailed description illustrates embodiments of the invention by way of example and not by way of limitation. It is contemplated that the invention has general application to systematic and methodical embodiments of controlling a vehicle in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
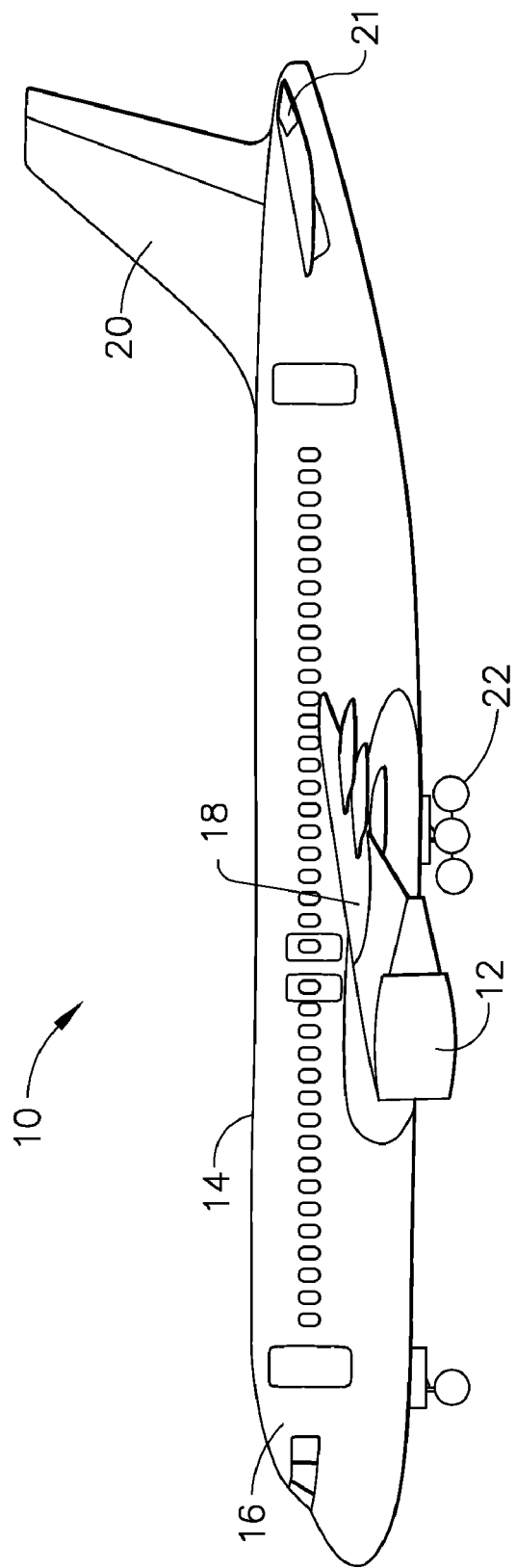
FIGS. 1-3 show exemplary embodiments of the method and apparatus described herein.

FIG. 1 is a side elevational view of a vehicle 10 such as an aircraft in accordance with an embodiment of the present disclosure. Aircraft 10 includes one or more propulsion engines 12 coupled to a fuselage 14, a cockpit 16 in fuselage 14, wing assemblies 18, a tail assembly 20 comprising one or more elevator flight surfaces 21, a landing assembly 22, a control system (not visible), and a plurality of other systems and subsystems that enable proper operation of vehicle 10.

Figure 2:
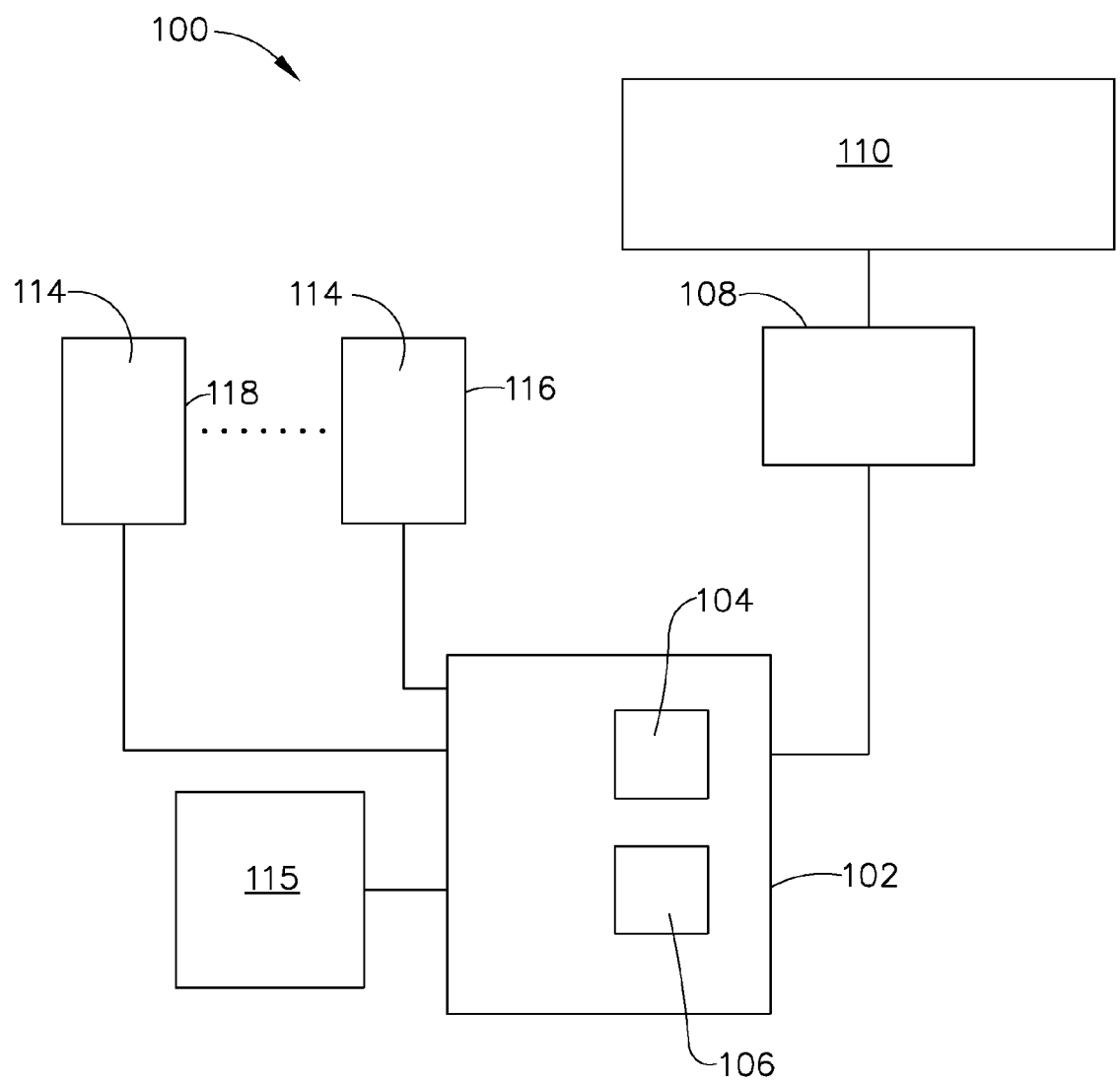

FIG. 2 is a schematic block diagram of a vehicle speed control system 100 in accordance with an exemplary embodiment of the present invention. In various embodiments, vehicle speed control system 100 may be part of a flight management system (FMS) (not shown). In various other embodiments, vehicle speed control system 100 may be a stand alone system. In the exemplary embodiment, vehicle speed control system 100 includes a controller 102 comprising a processor 104 communicatively coupled to a memory device 106. Controller 102 is communicatively coupled to an aircraft control system 108 configured to generate elevator control signals to control a flight path of the aircraft using elevators 21 on tail assembly 20. Controller 102 is configured to receive input signals from one or more input devices 114 or from other vehicle systems 115. Input devices 114 may include human input devices 116 and, for example, sensors 118 that provide signals related to a parameter of engine 110 or the vehicle. As used herein, human input devices 116 refers to computer devices that interact directly with humans such as, but not limited to, a keyboard, a mouse, a trackball, a touchpad, a pointing stick, a graphics tablet, a joystick, a driving or flight simulator device, a gear stick, a steering wheel, a foot pedal, a haptic glove, and a gestural interface.

During operation, processor 104 receives inputs from input devices 114, vehicle systems 115, and/or memory device 106 to generate signals to control the flight path of aircraft 10 using elevators 21. Moreover, the generated signals may be used to control the thrust of a gas turbine engine, position of a hydraulic actuator, torque and/or speed of an electric motor, or a power output of an internal combustion engine.

In the exemplary embodiment, an Idle+Δ flight path where the Δ thrust is based upon a desired speed margin is used in the generation of a theoretical descent path that is used to control the descent of the aircraft. A shallower Idle+Δ flight path is used in place of an Idle flight path during RTA operation. Moreover, this flight path is flown with elevators 21 controlling to the vertical path and the throttle controlling to speed enabling tighter speed control and enhanced RTA accuracy. The exemplary embodiment does not require the addition of empirically derived FMS performance database tables which remain static for each flight. Instead, the Δ is specified as a desired amount of speed margin (e.g. 10 KCAS) and could be modified by the crew during the flight via direct entry or indirect entry. Thus the Δ in Idle+Δ is directly correlated to a desired speed margin (ΔV). In the exemplary embodiment, a default ΔV is computed by the FMS which could then be overwritten by a crew entry. The default ΔV could simply be provided by a database; or it could be computed based upon the amount of speed margin required by the RTA algorithm to satisfy the time constraint within the desired accuracy on a consistent basis. In this latter case, inputs into the default ΔV computation may include the estimated uncertainty of the forecast winds and temperatures, the desired RTA accuracy, the distance or time to the RTA waypoint, the presence or lack of other performance entries, and the characteristics of the RTA algorithm itself. In some embodiments, the ΔV may only be an internal value.

The algorithm illustrated in the exemplary embodiment is derived as shown below. The energy exchange equation for unaccelerated flight is given by:

$$VS = \frac{T-D}{W} \cdot V_T, \text{ where} \tag{1}$$

VS is the rate of climb or vertical speed of the aircraft,
T is Thrust,
D is Drag,
W is Gross Weight of the aircraft, and
$V_T$ is the True airspeed of the aircraft.
Rewriting in a different form yields:

$$\frac{T-D}{W} = \frac{VS}{V_T} \quad (2)$$

Equation can be stated as: the potential flight path angle equals the actual flight path angle for unaccelerated flight. The problem is to compute the flight path angle (or VS) of an idle flight path that is ΔV slower than a desired flight speed and then compute the thrust required to fly that flight path angle at a required flight speed.

The thrust required to fly a particular flight path is given by:

$$T = D + \frac{VS}{V_T} \cdot W \quad (3)$$

The VS that is needed in the above equation is the VS of a flight path that is ΔV slower. This is given by the equation:

$$VS_{-\Delta V} = \frac{T_{-\Delta V} - D_{-\Delta V}}{W} \cdot V_{T-\Delta V} \quad (4)$$

Substituting then:

$$T = D + \frac{\frac{T_{-\Delta V} - D_{-\Delta V}}{W} \cdot V_{T-\Delta V}}{V_T} \cdot W \quad (5)$$

Which simplifies to:

$$T = D + \frac{V_{T-\Delta V}}{V_T} \cdot [T_{-\Delta V} - D_{-\Delta V}] \quad (6)$$

In this equation:
T is the Idle+Δ Thrust solution,
D is the drag at your desired speed,
$V_T$ is the true airspeed (TAS) equivalent of your desired speed,
$V_{T-\Delta V}$ is the TAS equivalent of your desired speed less ΔV,
$T_{-\Delta V}$ is idle thrust at the desired speed less ΔV, and
$D_{-\Delta V}$ is drag at the desired speed less ΔV.

The end result of this method, together with the use of an idle deceleration factor equal to (V/(V+ΔV)), is a single descent path that can be flown at a range of speeds governed by ΔV. When in descent, this speed margin allows RTA to make airspeed adjustments to compensate for time errors without the need to reconstruct the descent path. With this method, RTA only needs to reconstruct the path when the speed adjustment is outside the range of speeds governed by ΔV and the desired speed is not within ΔV of the minimum speed.

Finally, this method has application apart from RTA. The proposed method is useful on retrofit programs as a cost-effective means to incorporate Idle+Δ descent paths without the need to derive additional performance database tables. Likewise, this method has application as a means to derate a climb profile and support the development of path climb operations.

For a climb profile, the method is the same as proposed for the Idle+Δ descent paths with the following exceptions: (a) the maximum thrust (based on the thrust limit mode and derate selections) is used in place of idle and (b) ΔV is added to the desired speed rather than subtracted as it is in the Idle+Δ case.

Figure 3:
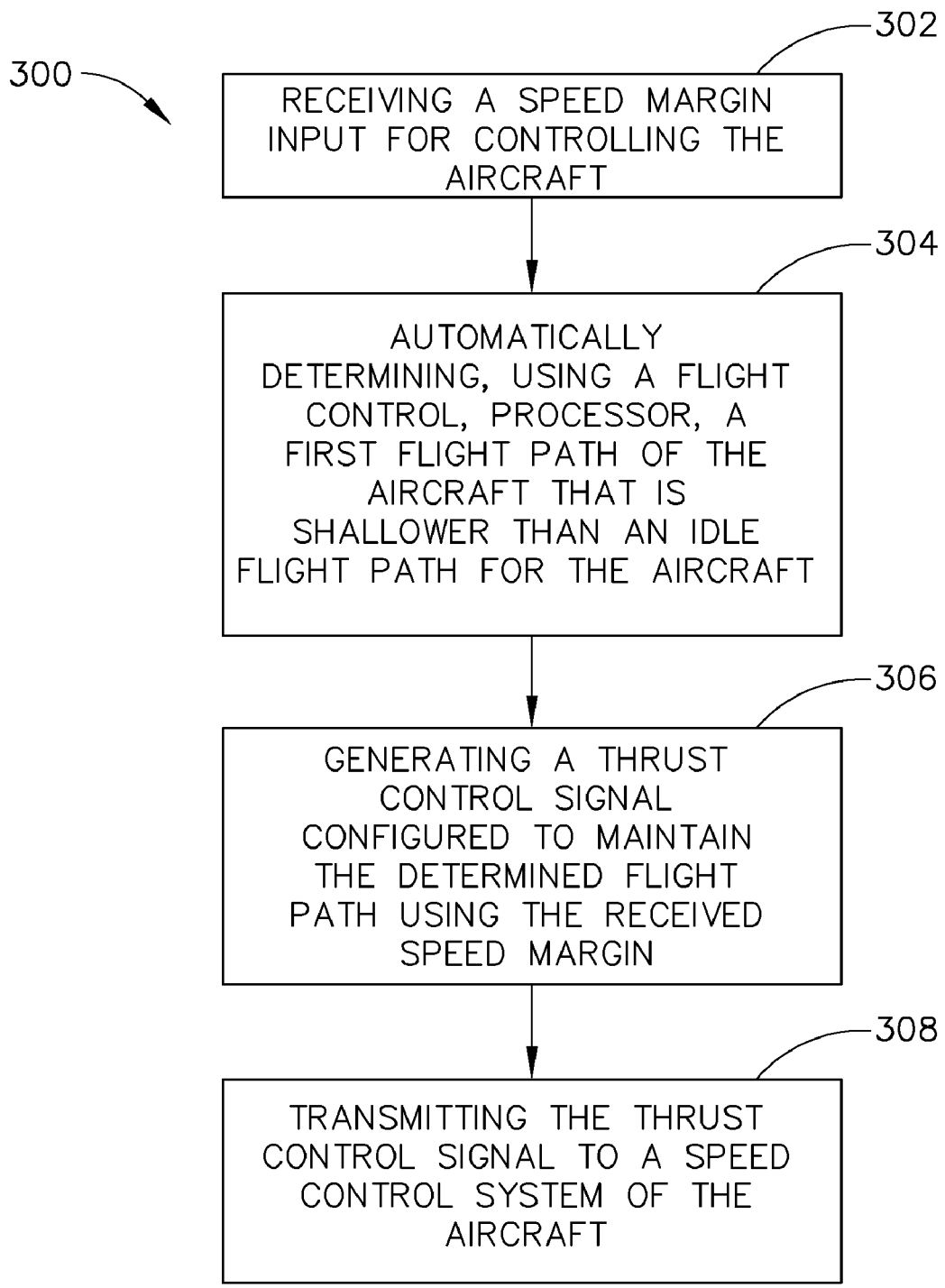

FIG. 3 is a flowchart of a method 300 of controlling an aircraft during descent in accordance with an exemplary embodiment of the present invention. Method 300 includes receiving 302 a speed margin input for controlling the aircraft, automatically determining, 304 using a flight control processor, a first flight path of the aircraft that is shallower than an idle flight path for the aircraft, generating 306 an elevator control signal configured to maintain the determined flight path using the received speed margin, and transmitting 308 the elevator control signal to an elevator control system of the aircraft.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 104, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is controlling an aircraft during descent to maintain a determined flight path by adjusting the aircraft elevators while maintaining the aircraft within a selectable speed margin. Moreover, embodiments of the claimed invention have advantages over the prior art including not requiring additional performance database tables, and permitting a variable A which can be modified by the crew. This offers the crew and airlines flexibility in making the appropriate tradeoff between time-of-arrival accuracy and fuel consumption. Furthermore, the variable Δ can be specified as a ΔV which allows good correlation with time-of-arrival accuracy. Finally, the methods of the exemplary embodiments of the invention provide a number of operational benefits over a single, constant FPA (e.g. shorter decelerations, more flexible, less aircraft-dependent) while being comparable in terms of ease of incorporation into existing FMS functionality.

Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of vehicle flight path control provide a cost-effective and reliable means for dynamically adjusting the position of the aircraft along a predetermined flight path using flight control surfaces, for example, the elevators. More specifically, the methods and systems described herein facilitate maintaining the defined vertical profile. As a result, the methods and systems described herein facilitate automatically adjusting the speed of the aircraft to maintain a predetermined flight path during a descent phase of a flight in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A control system for controlling a flight path of a vehicle, said system comprising:
   an input device configured to receive a speed margin value for the vehicle;
   a processor communicatively coupled to said input device, said processor programmed to:
   receive a speed target value, the speed target value representing a desired vehicle speed along the fight path;
   generate a thrust control signal using the speed target value;
   automatically determine a flight path of the vehicle that is shallower than an idle flight path for the vehicle using the thrust control signal, during a descent path an amount of thrust is determined using:

$$T = D + \frac{V_{T-\Delta V}}{V_T} \cdot [T_{-\Delta V} - D_{-\Delta V}],$$

where
T is the idle+Δ thrust solution,
D is the drag at your desired speed,
$V_T$ is the true airspeed (TAS) equivalent of the desired speed,
$V_{T-\Delta V}$ is the TAS equivalent of the desired speed less ΔV,
$T_{-\Delta V}$ is idle thrust at the desired speed less ΔV, and
$D_{-\Delta V}$ is drag at the desired speed less ΔV; and
generate a flight control surface control signal configured to maintain the determined flight path using the received speed margin; and
an output device communicatively coupled to said processor, said output device is configured to transmit the flight control surface control signal to a flight control system of the vehicle.

2. A control system in accordance with claim 1, wherein said input device is configured to receive the speed margin at least one of entered manually by a user using a user interface and transmitted automatically from a computed value storage location.

3. A control system in accordance with claim 2, wherein said input device is configured to receive the speed margin from a Required Time-of-Arrival (RTA) algorithm.

4. A control system in accordance with claim 1, wherein said output device is configured to transmit the flight control surface control signal to an elevator control system.

5. A control system in accordance with claim 1, wherein said processor is programmed to determine a new flight path when a flight speed of the vehicle is outside the speed margin.

6. A control system in accordance with claim 1, wherein the speed margin is determined using an estimated uncertainty of forecast winds and temperatures, a desired RTA accuracy, a distance or time to a next RTA waypoint, a presence or lack of other performance entries, and a characteristic of an RTA algorithm.

7. A method of controlling an aircraft during descent comprising:
   receiving a speed margin input for controlling the aircraft;
   generating a thrust control signal using a speed target value representing a desired vehicle speed along the fight path;
   automatically determining, using a flight control processor, a first flight path of the aircraft that is shallower than an idle flight path for the aircraft using the thrust control signal where an amount of thrust is determined using:

$$T = D + \frac{V_{T-\Delta V}}{V_T} \cdot [T_{-\Delta V} - D_{-\Delta V}],$$

where
T is the idle+Δ thrust solution,
D is the drag at your desired speed,
$V_T$ is the true airspeed (TAS) equivalent of the desired speed,
$V_{T-\Delta V}$ is the TAS equivalent of the desired speed less ΔV,
$T_{-\Delta V}$ is idle thrust at the desired speed less ΔV, and
$D_{-\Delta V}$ is drag at the desired speed less ΔV;
generating a flight control surface control signal configured to maintain the determined flight path using the received speed margin; and
transmitting the flight control surface control signal to a flight control surface control system of the aircraft.

8. A method in accordance with claim 7, further comprising controlling a speed of the aircraft using a throttle within the speed margin to maintain the determined flight path.

9. A method in accordance with claim 7, further comprising:
   determining a second flight path when the speed margin is exceeded; and
   controlling a speed of the aircraft within the speed margin to maintain the determined second flight path.

10. A method in accordance with claim 7 wherein determining a first flight path of the aircraft comprises determining a first flight path of the aircraft using a flight speed that is less than the desired speed by an amount equal to the speed margin.

11. A vehicle comprising:
    an input device configured to receive a speed margin input;
    a control system comprising a processor communicatively coupled to said input device, said processor programmed to:
    receive a speed target value, the speed target value representing a desired vehicle speed along the fight path;
    generate a thrust control signal using the speed target value;

automatically determine a flight path of the vehicle that is shallower than an idle flight path for the vehicle using the thrust control signal, during a descent path an amount of thrust is determined using:

$$T = D + \frac{V_{T-\Delta V}}{V_T} \cdot [T_{-\Delta V} - D_{-\Delta V}],$$

where

T is the idle+Δ thrust solution,
D is the drag at your desired speed,
$V_T$ is the true airspeed (TAS) equivalent of the desired speed,
$V_{T-\Delta V}$ is the TAS equivalent of the desired speed less ΔV,
T−ΔV is idle thrust at the desired speed less ΔV, and
$D_{-\Delta V}$ is drag at the desired speed less ΔV; and
generate a flight control surface control signal configured to maintain the determined flight path using the received speed margin; and
an output device communicatively coupled to said processor, said output device is configured to transmit the flight control surface control signal to a flight control surface control system.

12. A vehicle in accordance with claim 11, wherein said input device is configured to receive the speed margin at least one of entered manually by a user using a user interface and transmitted automatically from a computed value storage location.

13. A vehicle in accordance with claim 12, wherein said input device is configured to receive the speed margin from a Required Time-of-Arrival (RTA) algorithm.

14. A vehicle in accordance with claim 11, wherein said output device is configured to transmit the flight control surface control signal to an elevator control system.

15. A vehicle in accordance with claim 11, wherein said processor is programmed to determine a new flight path when a flight speed of the vehicle is outside the speed margin.

16. A vehicle in accordance with claim 11, wherein the speed margin is determined using an estimated uncertainty of forecast winds and temperatures, a desired RTA accuracy, a distance or time to a next RTA waypoint, a presence or lack of other performance entries, and a characteristic of an RTA algorithm.

17. A method of controlling an aircraft during ascent comprising:
receiving a speed margin input for controlling the aircraft;
automatically determining, using a flight control processor, a first flight path of the aircraft that is shallower than a climbing flight path that assumes maximum thrust and elevator controlling to the target speed for the aircraft the first flight path determined using a thrust control signal representing an amount of thrust determined using:

$$T = D + \frac{V_{T-\Delta V}}{V_T} \cdot [T_{-\Delta V} - D_{-\Delta V}],$$

where

T is the Maximum Thrust-Δ Thrust solution,
D is the drag at your desired speed,
$V_T$ is the true airspeed (TAS) equivalent of your desired speed,
$V_{T+\Delta V}$ is the TAS equivalent of your desired speed plus ΔV,
$T_{+\Delta V}$ is maximum thrust at the desired speed plus ΔV, and
$D_{+\Delta V}$ is drag at the desired speed plus ΔV;
generating a flight control surface control signal configured to maintain the determined flight path using the received speed margin; and
transmitting the flight control surface control signal to a flight control surface control system of the aircraft.

18. A method in accordance with claim 17, further comprising controlling a speed of the aircraft using a throttle within the speed margin to maintain the determined flight path.

* * * * *

UNITED STATES PATENT AND TRADEMARK OFFICE
CERTIFICATE OF CORRECTION

PATENT NO. : 8,311,687 B2  
APPLICATION NO. : 12/847835  
DATED : November 13, 2012  
INVENTOR(S) : Bakker Page 1 of 1

It is certified that error appears in the above-identified patent and that said Letters Patent is hereby corrected as shown below:

In the Specifications

In Column 6, Line 46, delete "A" and insert -- $\Delta$ --, therefor.

In the Claims

In Column 7, Line 36, in Claim 1, delete "fight path;" and insert -- flight path; --, therefor.

In Column 8, Line 21, in Claim 7, delete "fight path;" and insert -- flight path; --, therefor.

In Column 8, Line 38, in Claim 7, delete "T-$\Delta$V" and insert -- $T_{-\Delta V}$ --, therefor.

In Column 8, Line 54, in Claim 10, delete "7" and insert -- 7, --, therefor.

In Column 8, Line 65, in Claim 11, delete "fight path;" and insert -- flight path; --, therefor.

In Column 9, Line 17, in Claim 11, delete "T-$\Delta$V" and insert -- $T_{-\Delta V}$ --, therefor.

In Column 10, Lines 17-18, in Claim 17, delete "$T = D + \frac{V_{T-\Delta V}}{V_T} \cdot [T_{-\Delta V} - D_{-\Delta V}].$" and insert --
$$T = D + \frac{V_{T+\Delta V}}{V_T} \cdot [T_{+\Delta V} - D_{+\Delta V}],$$
--, therefor.

Signed and Sealed this  
Twenty-eighth Day of May, 2013

Teresa Stanek Rea  
*Acting Director of the United States Patent and Trademark Office*